(12) United States Patent
Kingston (10) Patent No.: US 12,228,032 B1
(45) Date of Patent: Feb. 18, 2025

(54) METALLIC SEAL

(71) Applicant: RTX Corporation, Farmington, CT (US)

(72) Inventor: Steven Daniel Kingston, Wolcott, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/380,860

(22) Filed: Oct. 17, 2023

(51) Int. Cl.
  *F01D 11/00* (2006.01)
  *F16J 15/08* (2006.01)

(52) U.S. Cl.
  CPC ......... *F01D 11/003* (2013.01); *F16J 15/0887* (2013.01); *F05D 2240/57* (2013.01)

(58) Field of Classification Search
  CPC ...... F01D 11/00; F01D 11/003; F01D 11/005; F16J 15/00; F16J 15/02; F16J 15/022; F16J 15/0887; F05D 2240/55; F05D 2240/57; F05D 2240/58
  See application file for complete search history.

(56) References Cited

U.S. PATENT DOCUMENTS

| | | | |
|---|---|---|---|
| 3,191,948 A | 6/1965 | Hamm | |
| 4,813,692 A | 3/1989 | Halling et al. | |
| 5,799,954 A | 9/1998 | Layer | |
| 6,065,438 A | 5/2000 | Kiesel | |
| 7,097,004 B2 | 8/2006 | Barrett et al. | |
| 7,837,233 B2 | 11/2010 | Johnston et al. | |
| 8,491,259 B2 | 7/2013 | Sutcu | |
| 10,058,961 B2 | 8/2018 | Buitenhuis et al. | |
| 2006/0290068 A1 | 12/2006 | Berdichevsky et al. | |
| 2007/0235948 A1 | 10/2007 | Halling | |
| 2008/0224422 A1* | 9/2008 | Halling | F16J 15/022 277/644 |
| 2016/0169234 A1* | 6/2016 | Gerard | F01D 11/003 415/204 |
| 2018/0187558 A1* | 7/2018 | Thistle | F04D 29/322 |
| 2021/0040892 A1* | 2/2021 | Stoyanov | F01D 11/003 |

FOREIGN PATENT DOCUMENTS

GB 593392 A 10/1947

OTHER PUBLICATIONS

European Search Report dated Nov. 27, 2024 for European Patent Application No. 24174659.3.

* cited by examiner

*Primary Examiner* — Elton K Wong
(74) *Attorney, Agent, or Firm* — Bachman & LaPointe, P.C.

(57) ABSTRACT

A metallic seal ring has a cross-section of a "6" or "9" shape with an open loop and an extension therefrom. The open loop is seated in a groove of an inner member and, in cross-section has three spaced contact locations with the groove at a first sidewall surface, a second sidewall surface, and a base surface, respectively with gaps between the contact locations. The seal extension has a fourth contact location with an inner surface of an outer member axially beyond a span between the first and second sidewall surface contact locations.

20 Claims, 5 Drawing Sheets

METALLIC SEAL

BACKGROUND

The disclosure relates to gas turbine engines. More particularly, the disclosure relates to piston seal rings (PSR).

Gas turbine engines (used in propulsion and power applications and broadly inclusive of turbojets, turboprops, turbofans, turboshafts, industrial gas turbines, and the like) use PSR in several situations.

A PSR seals between an inner member and an outer member. The inner member and outer member may be static structure such as case components. Or, the inner member and the outer member may be rotating structure such as components of a spool or rotor. The inner member and the outer member may be subject to small excursions relative to each other. For example, torque loads may cause small rotational movements; thrust loads or differential thermal expansion may cause small axial movements. Vibration may also cause small rotational, radial, or axial movements. Such small or transient rotational movements, however, are distinguished from continuous relative rotational movement such as in face seal or shaft seal between two relatively rotating components (e.g., two different spools or a spool and a static structure).

The PSR is accommodated in an outer diameter groove in the inner member. Under dynamic and/or pressure loading, the PSR seals against a sidewall of the groove and an inner diameter surface of the outer member. In one example of such a situation involving a rotor, the inner member is a shaft and the outer member is a rotor stack of the associated spool. In a more particular example, the outer member is a seal runner protruding axially from a protuberant bore of a disk of the rotor stack. Tension in the shaft holds the rotor stack in precompression. Small rotational, axial, and/or radial displacements of the shaft and seal runner may be caused by factors including transients and changes in operational conditions such as torque and thrust loads (which will vary between one steady state condition and another steady state condition). In such an example, the PSR is accommodated in an outer diameter (OD) groove in the shaft.

PSRs are often small in cross section so as to be relatively compliant compared to the contacting structure (e.g., members forming the groove and runner). The ring is split for assembly purposes and/or to allow radial expansion under centrifugal loading. The ring circumferential ends may form an overlapping joint (e.g., a shiplap joint). The small cross section and split provide the ring with little hoop strength and twist resistance. For example, with a nickel alloy shaft and nickel alloy runner, ring material may be nickel or cobalt alloy and may have generally similar material hardness (at least of a substrate if coated). Example coatings are one or more sprayed or brushed solid lubricant layers directly atop the substrate outer diameter surface and extending onto the substrate axial end surfaces.

Separately, a variety of sheet metal seals exist. For example, C-seals or C-ring seals come in: axial form wherein the cross-section is axially open; external pressure form wherein the cross-section is radially outwardly open; and internal pressure form wherein the cross-section is radially inwardly open. Additionally, there may be similar variations on E-seals and there may be seals with a greater number of wave cycles or convolutions (e.g., particularly bellows seals wherein the waveform of the cross-section is axial).

U.S. Pat. No. 6,065,438 (the '438 patent) shows an actual piston seal having a cross-section somewhat similar to the numerals "6" or "9". The loop/roll of the "6" or "9" is nested in the groove and the leg/tail/ascender of the "6" or "9" extends radially outward.

SUMMARY

One aspect of the disclosure involves a turbine engine rotor having: a shaft having an outer diameter groove having a first wall surface, a second wall surface and a base, a first axial direction defined from the first wall surface to the second wall surface; a blade disk having a protuberant disk bore having an inner diameter (ID) surface; and a seal ring encircling a central axis. The seal ring has: a first face contacting the first wall surface, the second wall surface, the base, and the ID surface; a second face spaced apart from the first face by a thickness; a first rim joining the first and second faces; and a second rim joining the first and second faces. The seal ring central axial cross-section passes: radially inward and axially in a first direction; then radially inward and axially opposite the first direction; then radially outward and axially opposite the first direction; and then radially outward and axially in the first direction.

A further embodiment of any of the foregoing embodiments may additionally and/or alternatively include the seal ring being a split ring seal having a single split.

A further embodiment of any of the foregoing embodiments may additionally and/or alternatively include the seal ring being metallic.

A further embodiment of any of the foregoing embodiments may additionally and/or alternatively include the seal ring being uncoated.

In a further embodiment of any of the foregoing embodiments, additionally and/or alternatively, the thickness is 0.20 millimeter to 2.0 millimeters over a majority of the cross-section.

In a further embodiment of any of the foregoing embodiments, additionally and/or alternatively the passing: radially inward and axially in a first direction; then radially inward and axially opposite the first direction; then radially outward and axially opposite the first direction; and then radially outward and axially in the first direction, is along a loop section of the cross-section; and the seal ring has: an axial length ($L_{SB}$, $L'_{SB}$) of the loop; and an overall axial length ($L_S$, $L'_S$) at least 130% (more narrowly at least 140% or at least 150%) of said axial length of the loop.

In a further embodiment of any of the foregoing embodiments, additionally and/or alternatively, the overall axial length ($L_S$, $L'_S$) is 140% to 250% (more narrowly 150% to 220% or 150% to 180%) of said axial length of the loop.

A further embodiment of any of the foregoing embodiments may additionally and/or alternatively include an overall radial span ($H_S$, $H'_S$) 75% to 120% (more narrowly 80% to 100% or 80% to 95%) of the axial length ($L_{SB}$, $L'_{SB}$) of the loop.

In a further embodiment of any of the foregoing embodiments, additionally and/or alternatively, the overall axial length ($L_S$, $L'_S$) is 140% to 250% (more narrowly 150% to 220% or 150% to 180%) of said axial length of the loop.

In a further embodiment of any of the foregoing embodiments, additionally and/or alternatively, a contact location of the seal ring and ID surface is axially beyond a contact location of the seal ring and the second wall surface relative to a contact location of the seal ring and the first wall surface.

In a further embodiment of any of the foregoing embodiments, additionally and/or alternatively, the first wall surface is a low pressure side surface and the second wall surface is a high pressure side surface; and/or the first wall surface is a forward surface and the second wall surface is an aft surface.

A further embodiment of any of the foregoing embodiments may additionally and/or alternatively include a method for assembling the turbine engine rotor, the method comprising: installing the seal ring to the shaft via translation opposite the first axial direction; the first face wedges against the shaft radially expanding the seal ring by circumferentially expanding a gap at a joint; the seal ring sliding over an apex of a wall of the groove; the seal ring relaxing into the groove to at least partially close the gap; and installing the blade disk via translation opposite the first axial direction relative to shaft so that the blade disk contacts the first face to compress the seal ring radially inward by a wedging action.

A further embodiment of any of the foregoing embodiments may additionally and/or alternatively include a method for manufacturing the seal ring, the method comprising: rolling a flat strip to form a loop section; and rolling the loop section strip into a ring form.

A further embodiment of any of the foregoing embodiments may additionally and/or alternatively include: grinding the second rim to an acute internal angle relative to the first face; and blunting a junction of the second rim and first face.

In a further embodiment of any of the foregoing embodiments, additionally and/or alternatively: the first face contact locations with the first wall surface, the second wall surface, and the base are along respective regions of locally tighter radius of curvature than adjacent regions.

A further aspect of the disclosure involves, a metallic seal comprising: a first face; a second face spaced apart from the first face by a thickness; a first rim joining the first and second faces; and a second rim joining the first and second faces, wherein: the seal central axial cross-section forms: a loop extending from the first rim and forming a radial minimum of the seal and a first axial extreme of the seal; and a leg extending from the loop to the second rim and forming a radial maximum of the seal and a second axial extreme of the seal; and the second rim is at an acute angle to the first face.

In a further embodiment of any of the foregoing embodiments, additionally and/or alternatively, the seal has: an axial length ($L_{SB}$, $L'_{SB}$) of the loop; and an overall axial length ($L_S$, $L'_S$) at least 130% (more narrowly at least 140% or at least 150%) of said axial length of the loop.

In a further embodiment of any of the foregoing embodiments, additionally and/or alternatively, the overall axial length ($L_S$, $L'_S$) is 140% to 250% (more narrowly 150% to 220% or 150% to 180%) of said axial length of the loop.

In a further embodiment of any of the foregoing embodiments, additionally and/or alternatively, the seal has: an overall radial span ($H_S$, $H'_S$) 75% to 120% (more narrowly 80% to 100% or 80% to 95%) of the axial length ($L_{SB}$, $L'_{SB}$) of the loop; and an overall axial length ($L_S$, $L'_S$) at least 130% (more narrowly at least 140% or at least 150%) of said axial length of the loop.

In a further embodiment of any of the foregoing embodiments, additionally and/or alternatively, the overall axial length ($L_S$, $L'_S$) is 140% to 250% (more narrowly 150% to 220% or 150% to 180%) of said axial length of the loop.

In a further embodiment of any of the foregoing embodiments, additionally and/or alternatively, the metallic seal is stainless steel. An overall axial length ($L_S$, $L'_S$) is 140% to 250% (more narrowly 150% to 220% or 150% to 180%) of an axial length of the loop.

In a further embodiment of any of the foregoing embodiments, additionally and/or alternatively: the radial minimum of the seal, the first axial extreme of the seal, and a second axial extreme of the loop are along respective regions of locally tighter radius of curvature than adjacent regions.

A further aspect of the disclosure involves a metallic seal ring having a cross-section of a "6" or "9" shape with an open loop and an extension therefrom (e.g., the ascender of the "6" or the tail/descender of the "9"). In longitudinal cross-section, the extension protrudes axially beyond the loop so that an overall axial length of the seal in said cross-section is at least 130% of an overall axial length of the loop. Further embodiments of this aspect may be as described for other aspects above or below.

A further aspect of the disclosure involves a metallic seal having a cross-section with an open loop section and an extension from the open loop section. The open loop is seated in a groove of an inner member and, in cross-section has three spaced contact locations with the groove at a first sidewall surface, a second sidewall surface, and a base surface, respectively with gaps between the contact locations. The seal extension has a fourth contact location with an inner surface of an outer member. The fourth contact location is axially beyond a span between the first sidewall surface and second sidewall surface contact locations. Further embodiments of this aspect may be as described for other aspects above or below.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
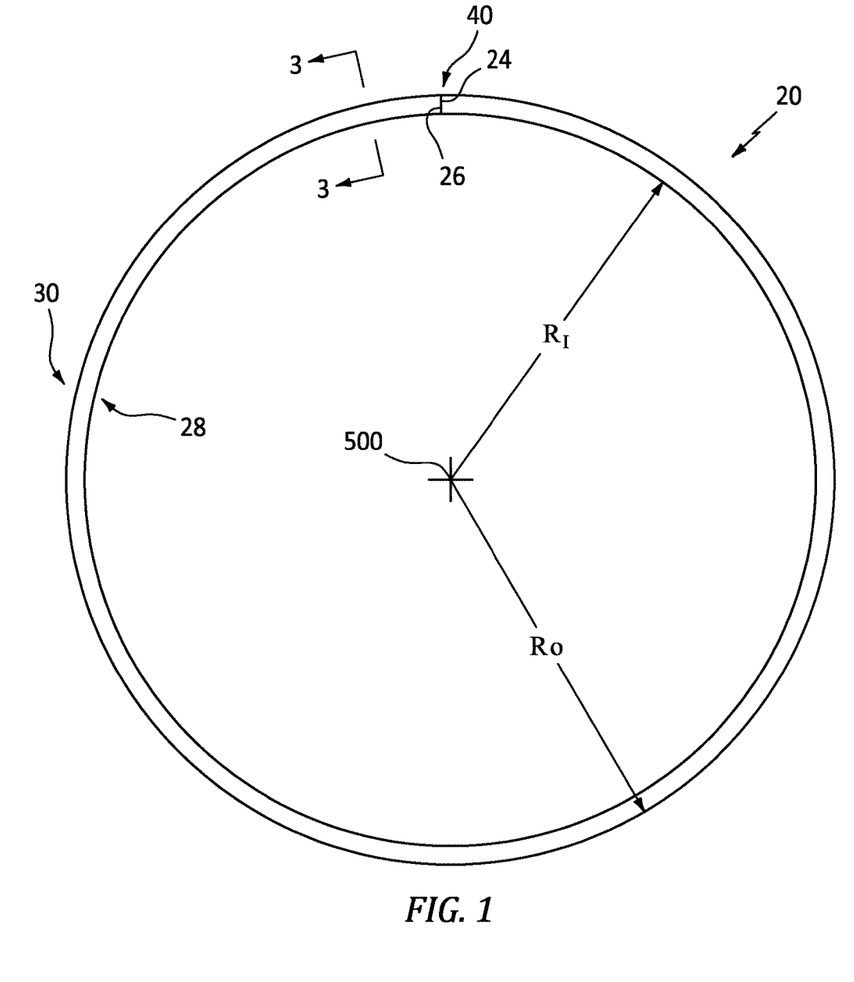
FIG. 1 is a low pressure side end view of a piston seal ring (PSR).
Figure 2:
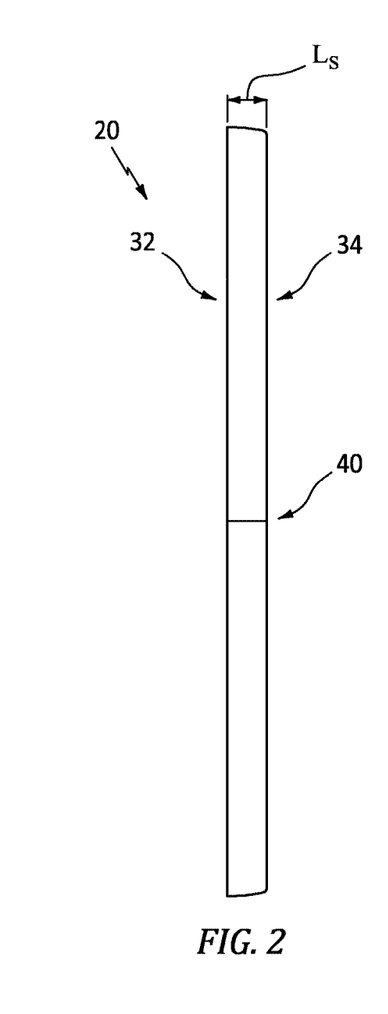
FIG. 2 is an inward radial view of joint of the PSR.

FIG. 1 shows a piston seal ring (PSR) formed as a split ring seal 20 having a first circumferential end 24, a second circumferential end 26, an inner diameter (ID) face 28, an outer diameter (OD) face 30, a first axial end face 32, and a second axial end face 34. The PSR has a nominal central longitudinal axis (centerline) 500 shared with the members it seals when in a nominally centered condition. In the example, first circumferential end 24 and second circumferential end 26 form a joint or junction 40. The example joint 40 is a butt joint. An alternative is a shiplap joint.

In central axial or longitudinal section (FIG. 3), the seal 20 is formed as a bent sheet (discussed further below) having a first face 42, a second face 44, and first 46 and second 48 rims or section ends/edges joining the faces. The cross-section is shaped somewhat similarly to the numerals "6" or "9" or the lowercase Greek letter sigma "σ" but in both cases with an open, rather than closed, loop or bulb 50 and rotated so that the extension or ascending portion (ascender or tail) 52 is directed generally axially away from the loop. This is not to be confused with the uppercase Greek letter "E" which is sometimes used alternatively to describe an E-seal.

Figure 3:
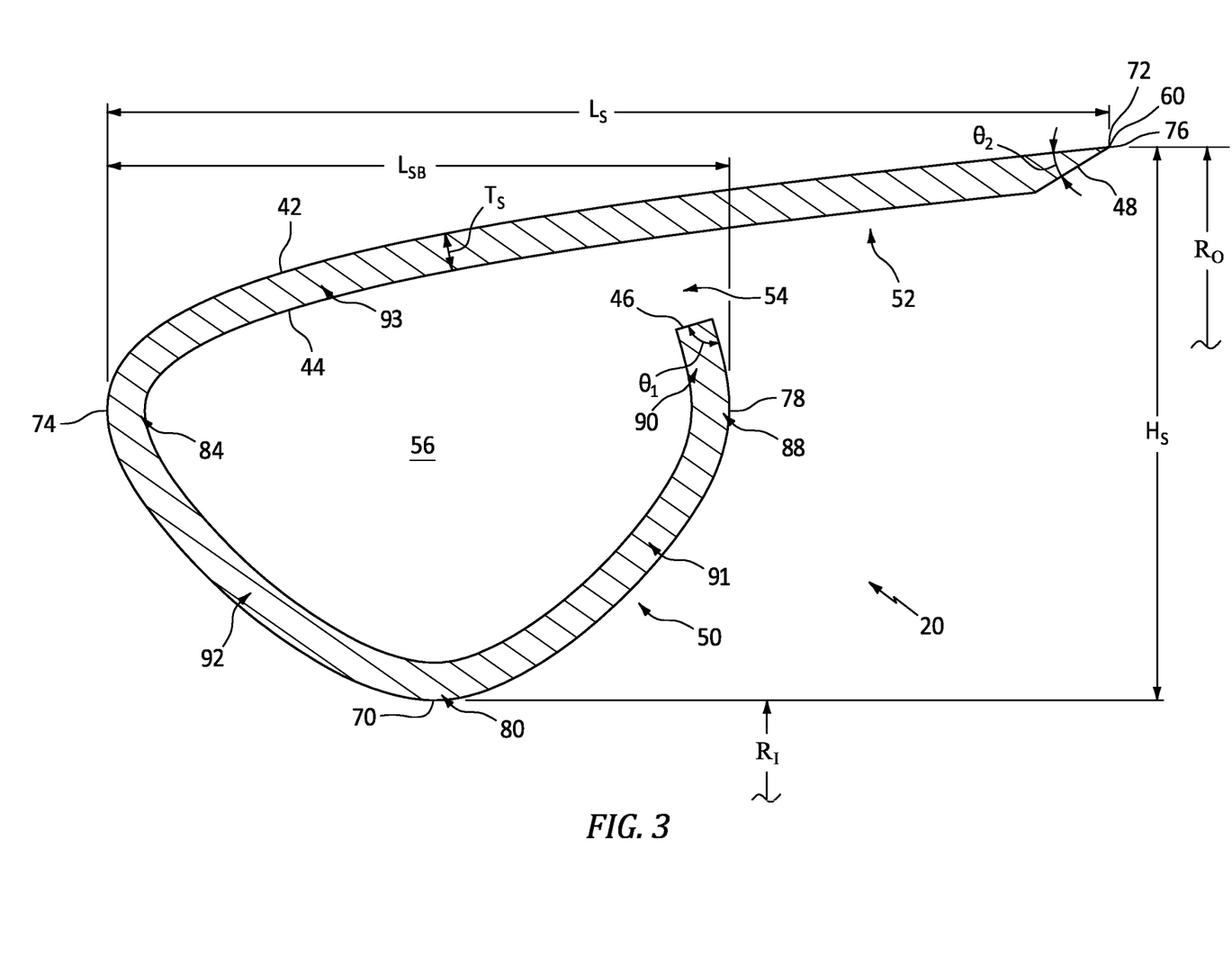
FIG. 3 is central longitudinal sectional view of the PSR, taken along line 3-3 of FIG. 1.

A gap 54 is formed between the rim 46 and the surface 44 so that the loop 50 is partially open with an interior 56. Thus, the surface 44 is an interior surface and the surface 42 is a generally exterior surface. Thickness between the faces 42 and 44 is shown as $T_S$. As is discussed below, this thickness may be generally uniform reflecting bending of the seal cross-section from an original precursor piece of plate or sheet stock of uniform thickness.

Example seal material is an alloy (e.g., steel, such as stainless steel) alone or as a substrate having a full or partial coating such as a hard coating, lubricious coating, or the like.

Rims 46, 48 may be chamfered or beveled and/or may themselves be chamfers or bevels. In the illustrated example, as discussed below, the rim 48 is essentially at an acute angle $\theta_2$ relative to the outer face 42 to itself be a bevel. Thus, the rim 48 and outer face 42 converge to a tip or edge 60. The tip or edge 60 may itself be rounded for minimization of stress and damage.

The rim 46 is shown at an angle $\theta_1$ relative to the outer surface 42. Example $\theta1$ is close to 90° and may reflect an original 90° angle of source material, subject to slight deformation during the forming of the cross-sectional shape.

In this example condition, the seal has an inboard radial extreme 70 along the loop 50 and an outboard radial extreme 72 along the extension 52. The example outboard radial extreme 72 is at or near the edge 60. Similarly, one axial extreme 74 of the seal (a low pressure side extreme as discussed below) is also along the surface 42 of the loop 50. The opposite axial extreme 76 of the seal (high pressure side extreme) is at or near the edge 60. The locations 72 and 76 may thus be very close to each other along the rounding of the edge 60. In alternative embodiments, the cross-sectional shape may cause a greater departure such as if the extension 52 curved back radially inward near the rim 48 so that the outward radial extreme 72 was further away from the edge 60 along the surface 42.

Additionally, the loop 50 has its own axial extreme 78 (high pressure side extreme) opposite the common low pressure side axial extreme 74 of the loop and overall seal. As is discussed further below, the extremes 70, 74, and 78 are along regions 80, 84, and 88 of reduced cross-sectional radius of curvature (tighter inward concavity (toward the interior 56) than portions of the loop aside the regions). In the example, each of these regions are of tighter curvature than the two of regions 90, 91, 92, 93 on either side of them. Region 90 is between end 46 and region 88; region 91 is between regions 88 and 80; region 92 is between regions 80 and 84; region 93 extends from region 84 through the remainder of the loop 50 and extension 52 to end 48. Such tight curvature is of the two faces and the mean between them. Also, for the face 42 it ignores slight local flattening at the contact location from compression or wear.

Thus, in the example, the seal central axial cross-section passes: from the end 46 radially inward and axially in a first direction (aft) along the region 90 and adjacent (e.g., radially outer) portion of the region 88; then radially inward and axially opposite the first direction (forward) along a further (radially inner) portion of the region 88, the region 91 and a/an (aft) portion of the region 80; then radially outward and axially opposite the first direction along a (forward portion of the region 80, the region 92, and the adjacent (e.g., radially inner) portion of the region 84; and then radially outward and axially in the first direction along a further (radially outer) portion of the region 84 through the extension 52.

An example radial height or span of the seal is shown as $H_S$. An example axial length of the seal is shown as $L_S$. An example axial length of the loop is shown as $L_{SB}$.

Example $T_S$ is about 0.23 millimeter, more broadly, 0.21 millimeter to 0.25 millimeter or 0.20 millimeter to 0.5 millimeter or 0.20 millimeter to 2.0 millimeters or 0.15 millimeter to 7.0 millimeter.

Example $\theta_2$ is about 25°, more broadly, 20° to 30° or 15° to 35°. Nevertheless, much higher maxima are possible particularly with rounding and even substantially cantilevering the rim 48 at an obtuse angle may be used to create a particular elastic response.

Example $R_I$ is about 5.0 centimeters to 7.0 centimeters for some applications, more broadly, 3.0 centimeters to 10.0 centimeters or 2.0 centimeters to 15.0 centimeters.

Example $H_S$ is about 3.3 millimeters, more broadly, 2.0 millimeters to 5.0 millimeters or 2.0 millimeters to 10.0 millimeters.

Example $L_S$ is about 6.1 millimeters, more broadly, 4.0 millimeters to 12.0 millimeters or 3.5 millimeters to 30 millimeters.

Example $L_{SB}$ is about 3.8 millimeters, more broadly, 3.0 millimeters to 6.0 millimeters or 2.5 millimeters to 12.0 millimeters.

In terms of proportions, the example overall axial length $L_S$, is at least 130%, more narrowly at least 140% or at least 150% of said axial length $L_{SB}$ of the loop with optional alternative example upper limits of 180%, 200%, 220% or 250% for any such lower limits. The example overall radial span $H_S$ is 75% to 120%, more narrowly 80% to 100% or 80% to 95% of the axial length $L_{SB}$ of the loop.

Figure 4:
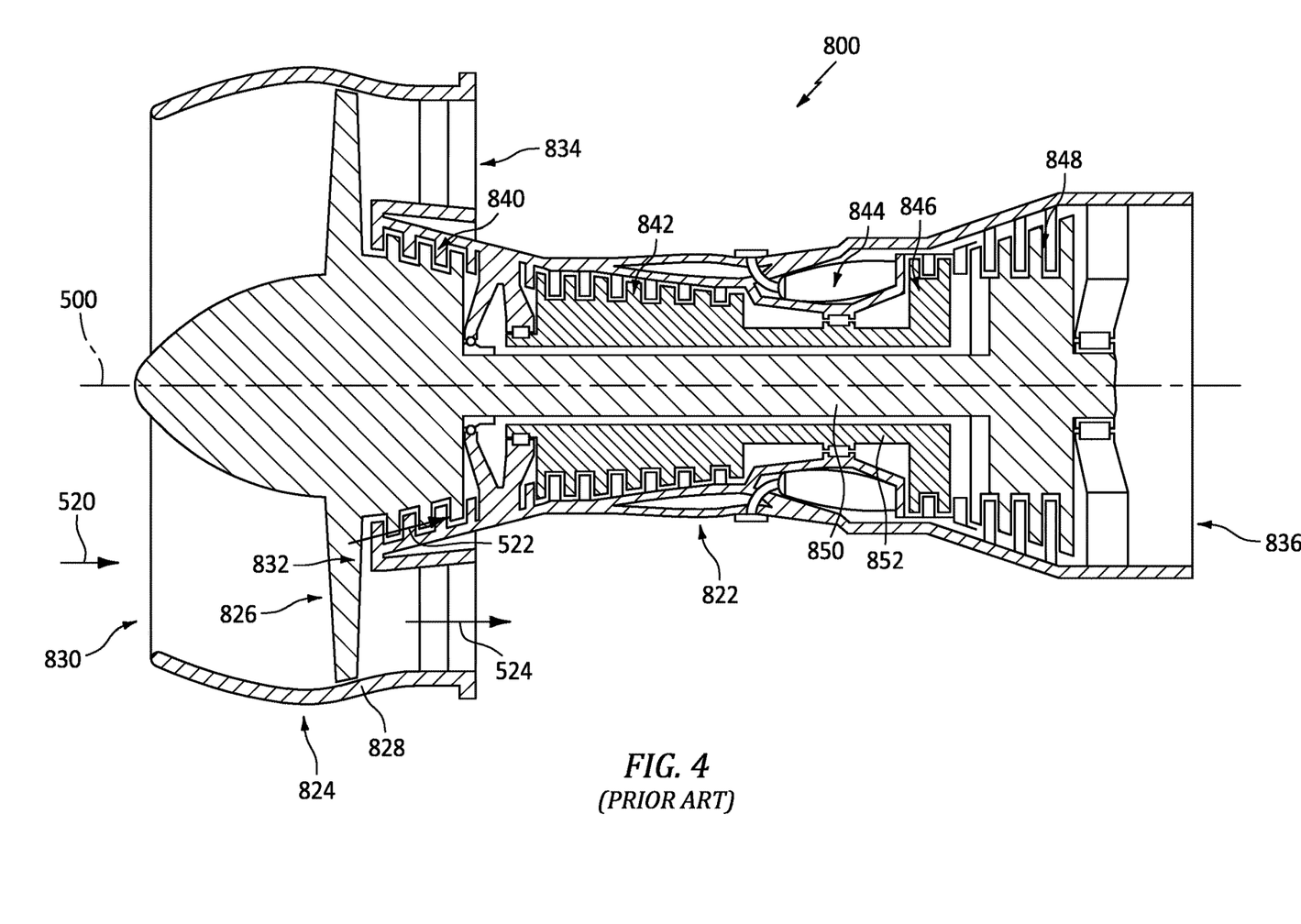
FIG. 4 is a view of a gas turbine engine containing the PSR.
Figure 4A:
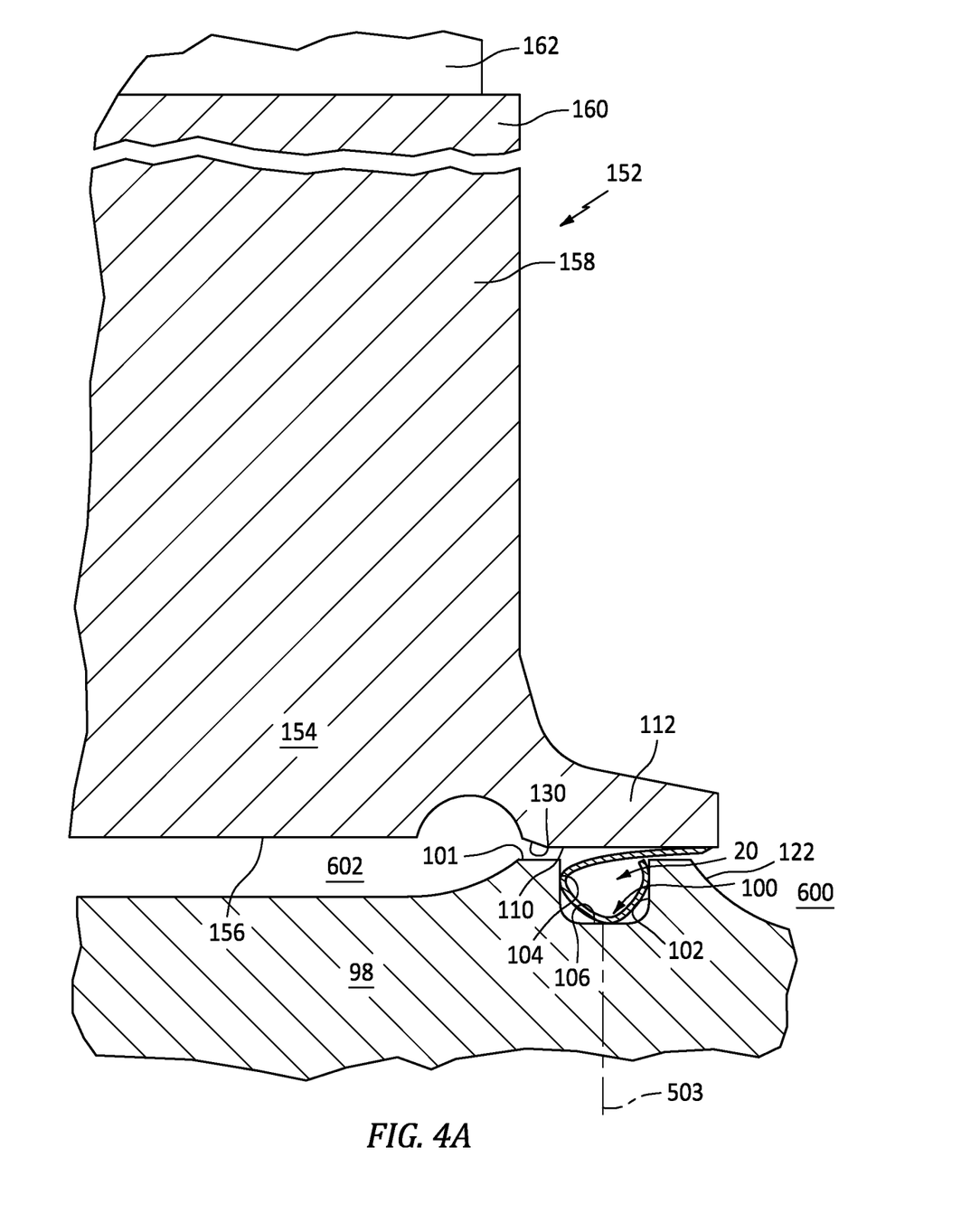
FIG. 4A is an enlarged central longitudinal sectional view of a rotor region of the gas turbine engine showing sealing engagement by the PSR.
Figure 4B:
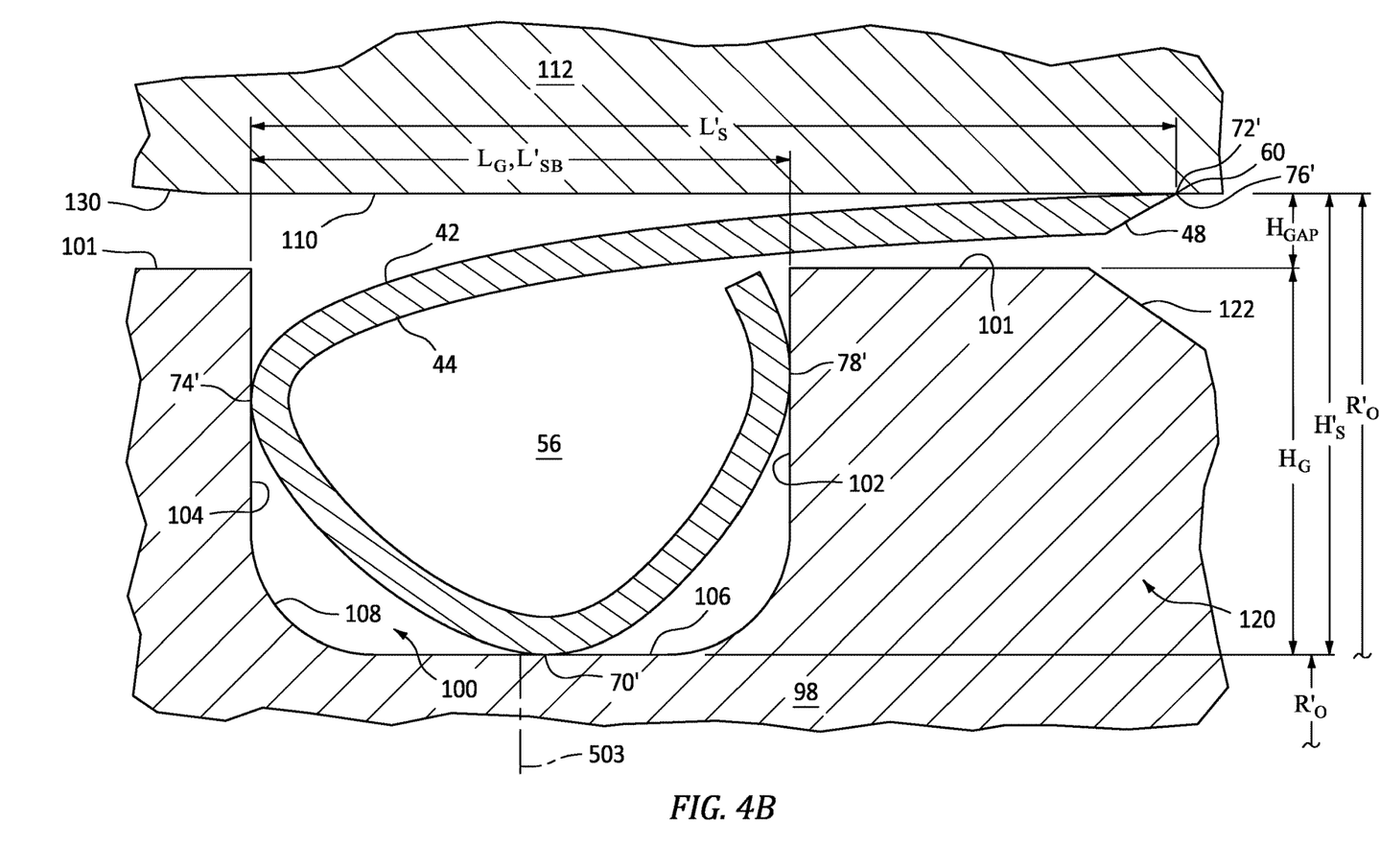
FIG. 4B is a further enlarged view of the rotor region of FIG. 4A.

In the installed condition of FIG. 4B, a number of dimensions are shown using the prime symbol to indicate there may be a change relative to the relaxed condition of FIG. 3. Similarly, for the locations of the extremes, the prime symbol is also used because there may be slight shifts in locations along the surface 42 particularly for the loop extremes 70', 74', and 78'. The example configuration may have much smaller, if any, departure of the extremes 72' and 76' from their relaxed counterparts.

FIG. 4B shows the seal 20 seated in an outer diameter groove 100 in an inner member (e.g., shaft or shaft section) 98 and sealing against an ID surface 110 of an outer member 112 (e.g., a seal runner shown formed as a "bore foot"). The groove 100 has a first sidewall or end wall 102, a second sidewall or end wall 104, and a base 106 joining the two. The groove has a transverse centerplane 503. In the example gas turbine engine, the first sidewall is an aft sidewall and the second sidewall is a forward sidewall. Example junctions between the sidewalls and the base are shown as quarter-rounds, chamfers, or bevels 108. However, right angle junctions or other transitions are possible. The groove 100 extends radially inward from an outer diameter (OD) surface section or portion 101 of the inner member.

FIG. 4A shows the seal 20 in a gas turbine engine rotor 150 including the shaft section 98. The example rotor is the high pressure compressor (HPC) portion of a high pressure spool of a two-spool engine. The rotor includes a stack of blade disks 152. Each blade disk includes a protuberant inner diameter (ID) bore 154 having an ID surface 156. A radial web 158 extends outward from the bore to a rim structure 160. A circumferential array of blades 162 (shown with airfoil tips cut away) may be mounted to the rim (e.g., via fir tree or dovetail mounting). Or, blade airfoils may be unitarily formed with the rim and the rest of the disk (e.g., an integrally bladed rotor (IBR)).

The example seal 20 seals between the rotor shaft section 98 and one of the disk bores 154 as they rotate as a unit. The PSR accommodates small excursions between the two members it seals due to dynamic or static loading, thermal effects, and the like. The example seal runner 112 is unitarily formed with the particular disk bore and protrudes axially from the disk bore near the ID surface thereof to a free distal end/rim of the seal runner. This is one non-limiting example of one baseline.

FIG. 4A shows the sealing between a first region or volume 600 and a second region or volume 602. In an example dynamic operating condition, the first region is a high pressure region and the second region is a low pressure region.

In the installed condition, the loop forms three contact points 70', 74', 78' with the groove base 106 and two side wall surfaces 104, 102, respectively. The ascending portion 52 of the cross-section forms a contact point 72' with the ID surface 110 of the outer member. All four of these contact points are along convex portions of the cross-section of the first face 42. In this example, the cross-section of the first face is entirely convex and, thus, the cross-section of the second face 44 is entirely concave in the central longitudinal section. Clearly, they are also respectively convex and concave in transverse cross-section.

The loop 50 extends from the first end/rim 46 to a transition to the extension 52 which, in turn, extends to the second end/rim 48. The loop is generally radially inboard of the extension. A portion of the first face on the loop forms a radial inboard extreme 70' and a portion of the first face on the extension forms a radially outboard extreme 72'. In this example, the second end/rim 48 forms one axial outboard extreme and a portion of the first surface along the loop forms an opposite axial extreme 74'. Due to strain of the seal when installed, there may be a slight departure of the locations of the radial outboard extreme, radial inboard extreme, first axial extreme, and second axial end extreme between relaxed/uninstalled and compressed/installed conditions and further slight operational changes once installed.

In an example installation, the seal 20 is installed to the inner member from what will become the high pressure side via axial translation (e.g., forward translation in the example). The first surface 44, along the loop inboard of the second axial end cams/wedges against an outboard end (e.g., a bevel surface 122) of the high pressure wall 120 radially expanding the seal such as by circumferentially expanding a gap at the joint 40. Eventually, the seal will slide over an apex of the high pressure wall 120 (e.g., with contact at an instant radial minimum at or near the ultimate radial minimum). The seal will then snap into the groove. This will at least partially close the gap/joint 40.

In the example, the bore foot 112 has an ID bevel 130 at a forward or low pressure side. This allows the outer member (disk) to similarly be inserted/installed from the high pressure side by a translation relative to the inner member. The outer member will thus contact the first surface 42 along the extension 52 and compress the extension radially inward by a camming/wedging action. Ultimately, the seated installed/compressed condition is achieved.

In operation, there may be varying degrees of relative movement such as slight axial sliding of the outer member along the seal and uniform or local radial displacements. For example, thrust loading and/or differential thermal expansion may produce essentially uniform and constant axial shifts and uniform and constant radial shifts whereas vibration or asymmetric stimulus may cause temporally varying excursions and/or non-uniform radial excursions (e.g., inner and outer members closing at one circumferential location and opening at diametrically opposite). Additionally, torque and twist may cause slight circumferential displacements accommodated by sliding interaction of the outer member relative to the seal and/or the inner member relative to the seal.

In the installed condition, the extension 52 is axially cantilevered extending past the groove 100 out over the high pressure sidewall 120. This can provide several benefits. First, it provides a relatively compliant interaction versus a stiff interaction of otherwise similar C-seal (e.g., similar material, similar thickness). The local thickness $T_S$ is shown between the faces and may represent thickness of the original sheetstock subject to minor losses from polishing and/or increases from plating/coating. The example seal is formed from an alloy (e.g., stainless steel). The example seal is uncoated. However, alternative seals may have coatings for one or more purposes such as a lubricious coating or anti-wear coating along the first face and/or a corrosion coating along the second face.

The open loop cross-section (gap 54) exposes the seal surface 44 to high side pressure opposite all four contact points. This helps bias the seal into sealing engagement at the contact points. Additionally, the cantilevered axial protrusion of the extension 52 helps allow radially outward flexing of the extension so that centrifugal loading biases the contact point 72' into sealing engagement the ID surface 110 of the outer member. The axial protrusion of the extension may synergize with the lack of the extension curving back radially inward to provide such case of flexing.

FIG. 1 shows a radial span between the radial minimum and radial maximum. FIG. 1 further shows an overall axial span of the seal; an axial span between the low pressure side axial extreme and the radial maximum; an axial span between the radial maximum and the high pressure side overall axial extreme (the first end). Example deformations are relatively small.

An example height $H_{GAP}$ of a radial gap spanned by the extension 52 between the outer member high pressure sidewall OD surface and outer member ID surface is about 0.48 millimeter, more broadly, 0.40 millimeter to 0.55 millimeter or 0.30 millimeter to 2.0 millimeters. FIG. 4B also shows a groove depth or height HG and a groove length LG. A groove base radius is $R'_I$ and an outer member inner radius is $R'_O$.

Example $H'_S$ is 90% to 95% of $H_S$, more broadly 80% to 96% or 75% to 98%. Example $L'_{SB}$ is similarly about 90% to 95% of $L_{SB}$, more broadly 80% to 96% or 75% to 98%. Example $L'_S$ may have very little departure from $L_S$. Thus, Example $L'_S$ is 100% to 105% of $L_S$, more broadly, 99% to 105% or 98% to 110%. Accordingly, given these small departures, the broad example relaxed dimensions and proportions may be used as proxies to alternatively define compressed dimensions and proportions in the claims below. Thus, as a general matter, it may be appropriate to claim a given value of dimension or proportion without reference to condition and then alternatively in dependent claims, reference that dimension (or proportion) as either a relaxed dimension (or proportion) or a compressed/installed dimension (or proportion).

Example seal manufacture may start with a strip of spring steel (or other alloy) of the desired thickness $T_S$.

The loop or bulb (or precursor thereof) is formed over a guide or mandrel (e.g., by rolling) the exterior surface of which is shaped to form the loop precursor interior. An example guide has a rounded-corner triangular cross-section so that the corners form the FIG. 3 tight radius regions 88, 80, and 84.

To form into a ring, the circumferential radius of the seal ring about its axis 500 is formed to the required dimensions by rolling (e.g., parallel to the ultimate axis 500) the ascender/tail about a second guide. This step may further deform the loop or bulb section precursor to the ultimate cross-sectional shape of the loop or bulb.

The seal may optionally be heat treated to obtain desired properties (e.g., heat treatment can modify the grain structure adding durability or can relieve some residual stresses from cold forming the part around the aforementioned guides).

The rim angle $\theta_2$ may be ground.

The edge 60 may be abrasively blunted for durability as is done to knife edges.

Among further opportunities for tuning seal performance involve the nature of the joint 40. At one extreme, dimensions may be such that there is a complete gap between ends 24 and 26 in all installed circumstances. This extreme, for example, would include all conditions such as differential radial expansion of the bore and shaft due to heating or centrifugal loading and non-axisymmetric variations such as slight departures of the shaft and disk from concentricity or slight departures of either from circularity.

Another extreme may involve securing the joint such as via welding (e.g., after installing to the shaft but before outer member (disk) installation). The lack of ability to open or close a gap will influence elastic behavior of the seal. It may be selected along with material and dimensions (particularly thickness) to achieve a desirable sealing contact in particular conditions of interest.

Other variations involve non-uniform gaps and/or non-consistent gaps. For example, a gap may fully close in some conditions but fully open in other conditions or the gap may open in some locations between the rims 46 and 48 but not others. This latter option may, particularly, be relevant if the circumferential ends 24 and 26 are machined to be other than parallel to each other in a central longitudinal plane.

In addition to the illustrated butt joint and alternative joints more resembling shiplap joints or miter joints, further alternatives may involve an interfitting where one end portion 24 or 26 is inserted/received in another. For example, a portion at one of the ends 24 and 26 may be deformed/shrunk to telescopically interfit with the other end portion so that the outer surface 42 of the shrunk portion slidingly contacts or closely faces the inner surface 44 of the other end portion into which the former is received. The shrinking of the inserted end portion may be achieved by deforming in a die.

Alternatively, one end 24 or 26 may be internally beveled and the other end externally beveled so as to be partially receivable in the former. For example, with such a bevel, even if the circumferential gap is the same as a straight butt, the angling of the gap may impose greater resistance to leakage. Furthermore, the circumferential gap may be reduced relative to the straight butt because any interference would simply provide a wedging interaction of the externally beveled end into the internally beveled end. This wedging would merely potentially open up gaps with the contact surfaces of the groove and runner but would not overly stress the seal. In yet other hypothetical embodiments, there may be no pre-shrinkage but merely one end inserted into the other to telescope thus opening up gaps at the contact locations along a small circumferential extent.

FIG. 4 shows an example gas turbine engine 800 as a two-spool turbofan engine. Although shown as a high bypass turbofan, a low bypass turbofan may have similar features. The engine 800 has an engine case 822 surrounding a centerline or central longitudinal axis 500. An example engine has a fan section 824 including a fan 826 within a fan case 828. The example engine includes an inlet 830 at an upstream end of the fan case receiving an inlet flow along an inlet flowpath 520. The fan 826 has one or more stages 832 of fan blades (typically one in a high bypass turbofan and more in a low bypass turbofan). Downstream of the fan blades, the flowpath 520 splits into an inboard portion 522 being a core flowpath and passing through a core of the engine and an outboard portion 524 being a bypass flowpath exiting an outlet 834 of the fan case.

The core flowpath 522 proceeds downstream to an engine outlet 836 through one or more compressor sections, a combustor, and one or more turbine sections. The example engine has two axial compressor sections and two axial turbine sections, although other configurations are equally applicable. From upstream to downstream there is a low pressure compressor section (LPC) 840, a high pressure compressor section (HPC) 842, a combustor section 844, a high pressure turbine section (HPT) 846, and a low pressure turbine section (LPT) 848. Each of the LPC, HPC, HPT, and LPT comprises one or more stages of blades which may be interspersed with one or more stages of stator vanes. In many low bypass turbofan configurations, the core and bypass flows rejoin to exit a nozzle (e.g., a variable nozzle).

In the example engine, the blade stages of the LPC and LPT are part of a low pressure spool mounted for rotation about the axis 500. The example low pressure spool includes a shaft (low pressure shaft) 850 which couples the blade stages of the LPT to those of the LPC and allows the LPT to drive rotation of the LPC. In the example engine, the shaft 850 also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft 852 (of which the shaft section 198 forms a section) mounted for rotation about the axis 500 and coupling the blade stages of the HPT to those of the HPC to allow the HPT to drive rotation of the HPC. In the combustor 844, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

Alternatively to sealing a disk bore to a shaft, such a seal may be applied to static structures such as cases. Alternatively, applications beyond gas turbine engines include pumps, turbochargers, and other turbomachines.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbine engine rotor comprising:
    a shaft having an outer diameter groove having a first wall surface, a second wall surface and a base, a first axial direction defined from the first wall surface to the second wall surface;
    a blade disk having a protuberant disk bore having an inner diameter (ID) surface; and
    a seal ring encircling a central axis and having:
        a first face contacting the first wall surface, the second wall surface, the base, and the ID surface;
        a second face spaced apart from the first face by a thickness;
        a first rim joining the first and second faces; and
        a second rim joining the first and second faces,
    wherein the seal ring central axial cross-section passes:
        radially inward and axially in a first direction;
        then radially inward and axially opposite the first direction;
        then radially outward and axially opposite the first direction; and
        then radially outward and axially in the first direction.

2. The turbine engine rotor of claim 1 wherein the seal ring is a split ring seal having a single split.

3. The turbine engine rotor of claim 1 wherein the seal ring is metallic.

4. The turbine engine rotor of claim 1 wherein:
    the thickness is 0.20 millimeter to 2.0 millimeters over a majority of the cross-section.

5. The turbine engine rotor of claim 1 wherein:
    the passing:
        radially inward and axially in a first direction;
        then radially inward and axially opposite the first direction;
        then radially outward and axially opposite the first direction; and
        then radially outward and axially in the first direction,
    is along a loop section of the cross-section; and
    the seal ring has:
        an axial length ($L_{SB}$, $L'_{SB}$) of the loop; and
        an overall axial length ($L_S$, $L'_S$) at least 130% of said axial length of the loop.

6. The turbine engine rotor of claim 5 wherein:
    the overall axial length ($L_S$, $L'_S$) is 140% to 250% of said axial length of the loop.

7. The turbine engine rotor of claim 5 having:
    an overall radial span ($H_S$, $H'_S$) 75% to 120% of the axial length ($L_{SB}$, $L'_{SB}$) of the loop.

8. The turbine engine rotor of claim 7 wherein:
    the overall axial length ($L_S$, $L'_S$) is 140% to 250% of said axial length of the loop.

9. The turbine engine rotor of claim 1 wherein:
    a contact location of the seal ring and ID surface is axially beyond a contact location of the seal ring and the second wall surface relative to a contact location of the seal ring and the first wall surface.

10. The turbine engine rotor of claim 9 wherein:
    the first wall surface is a low pressure side surface and the second wall surface is a high pressure side surface; and/or
    the first wall surface is a forward surface and the second wall surface is an aft surface.

11. A method for assembling the turbine engine rotor of claim 1, the method comprising:
    installing the seal ring to the shaft via translation opposite the first axial direction;
    the first face wedges against the shaft radially expanding the seal ring by circumferentially expanding a gap at a joint;
    the seal ring sliding over an apex of a wall of the groove;
    the seal ring relaxing into the groove to at least partially close the gap; and
    installing the blade disk via translation opposite the first axial direction relative to shaft so that the blade disk contacts the first face to compress the seal ring radially inward by a wedging action.

12. A metallic seal ring encircling a central axis and comprising:
    a first face;
    a second face spaced apart from the first face by a thickness;
    a first rim joining the first and second faces; and
    a second rim joining the first and second faces,
    wherein:
        the seal ring central axial cross-section forms:
            a loop extending from the first rim and forming a radial minimum of the seal ring and a a first axial extreme of the seal ring; and
            a leg extending from the loop to the second rim and forming a radial maximum of the seal ring and a second axial extreme of the seal ring;
        the second rim is at an acute angle to the first face; and
        the radial minimum of the seal ring, the first axial extreme of the seal ring, and a second axial extreme of the loop are along respective regions of locally tighter radius of curvature than adjacent regions.

13. The metallic seal ring of claim 12 wherein the seal ring has:
    an axial length ($L_{SB}$, $L'_{SB}$) of the loop; and
    an overall axial length ($L_S$, $L'_S$) at least 130% of said axial length of the loop.

14. The metallic seal ring of claim 13 wherein:
    the overall axial length ($L_S$, $L'_S$) is 140% to 250% of said axial length of the loop.

15. The metallic seal ring of claim 12 wherein the seal ring has:
    an overall radial span ($H_S$, $H'_S$) 75% to 120% of the axial length ($L_{SB}$, $L'_{SB}$) of the loop; and
    an overall axial length ($L_S$, $L'_S$) at least 130% of said axial length of the loop.

16. The metallic seal ring of claim 15 wherein:
    the overall axial length ($L_S$, $L'_S$) is 140% to 250% of said axial length of the loop.

17. The metallic seal ring of claim 12 being stainless steel.

18. A method for manufacturing the metallic seal ring of claim 12, the method comprising:
    rolling a flat strip to form a loop section; and
    rolling the loop section strip into a ring form.

19. The method of claim 18 further comprising:
    grinding the second rim to an acute internal angle relative to the first face; and
    blunting a junction of the second rim and first face.

20. A metallic seal ring encircling a central axis and comprising:
    a first face;
    a second face spaced apart from the first face by a thickness;
    a first rim joining the first and second faces; and
    a second rim joining the first and second faces,
    wherein:
        the seal ring central axial cross-section forms:

a loop extending from the first rim and forming a radial minimum of the seal ring and a a first axial extreme of the seal ring; and a leg extending from the loop to the second rim and forming a radial maximum of the seal ring and a second axial extreme of the seal ring;

the radial minimum of the seal ring, the first axial extreme of the seal ring, and a second axial extreme of the loop are along respective regions of locally tighter radius of curvature than adjacent regions; and the seal ring has:

an axial length ($L_{SB}$, $L'_{SB}$) of the loop; and an overall axial length ($L_S$, $L'_S$) at least 130% of said axial length of the loop.

\* \* \* \* \*